P. C. NASON.
Photographic Backgrounds.

No. 146,196. Patented Jan. 6, 1874.

WITNESSES.
E. Wolff
O. Sedgwick

INVENTOR.
P. C. Nason
BY
ATTORNEYS.

AM. PHOTO-LITHOGRAPHIC Co. N.Y. (OSBURNE'S PROCESS)

UNITED STATES PATENT OFFICE.

PRESTON C. NASON, OF COLUMBUS, OHIO.

IMPROVEMENT IN PHOTOGRAPHIC BACKGROUNDS.

Specification forming part of Letters Patent No. 146,196, dated January 6, 1874; application filed November 8, 1873.

*To all whom it may concern:*

Figure 1:
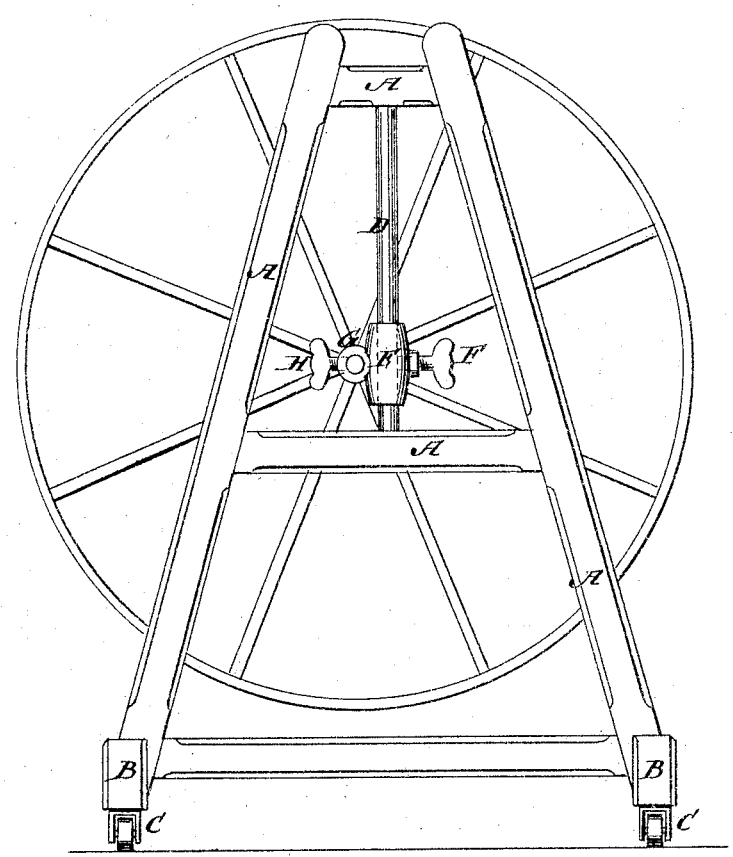
Figure 2:
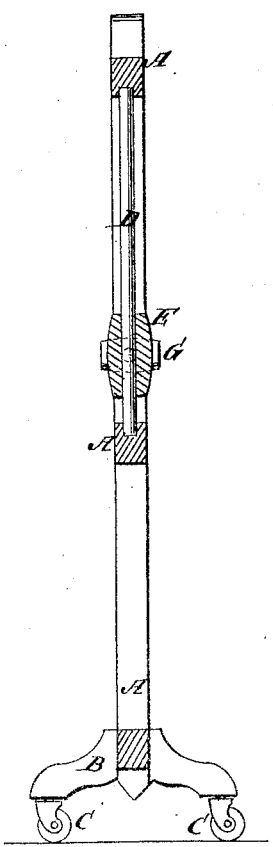

Be it known that I, PRESTON C. NASON, of Columbus, in the county of Franklin and State of Ohio, have invented a new and useful Improvement in Background-Carriage for Photographers, of which the following is a specification:

Figure 1 is a rear view of my improved background-carriage. Fig. 2 is a detail vertical section of the same.

Similar letters of reference indicate corresponding parts.

My invention has for its object to furnish an improved background-carriage for photographers' use, which shall be simple in construction and convenient in use, being easily manipulated and moved from place to place, and enabling the operator to adjust it while standing sufficiently far in its front to see when it is brought into position to give the desired effect in the relief of light and shade, thus entirely removing the objections to the ordinary background-stands, the inconvenience encountered in using, and the time required for adjusting, and the labor of moving them from place to place causing them to be seldom used, and thus tending to deprive photographers of a valuable accessory to their art.

The invention will first be fully described, and then pointed out in claim.

A is the frame of the carriage, consisting of two side bars, inclining toward each other, and connected at their upper, lower, and middle parts by three cross-bars, as shown in Figs. 1 and 2. To the lower ends of the side bars of the frame A, and at right angles with the plane of said frame, are rigidly attached two cross-bars, B, to serve as feet to said frame, and which should be made of such a length as to give a firm support to said frame. To each end of each of the cross-bars B is pivoted a caster-wheel, C, as shown in Fig. 2, so that the carriage may be easily moved from place to place. D is a metallic rod, the ends of which are securely and rigidly attached to the centers of the upper and middle cross-bars of the frame A. E is a socket, which is placed upon the rod D, and which may be turned and moved up and down upon the said rod D. The socket E is secured in place, when adjusted upon the rod D, by a set-screw, F, passing in through its side and resting against the said rod. Upon the side of the socket E, and at right angles therewith, is formed a second socket, G, to receive the spindle of the background, which is secured in place, when adjusted, by a set-screw, H.

By this construction, the background may be readily adjusted by taking hold of its edge while standing at such a distance in its front as to see when it is brought into position to give the desired effect.

By this construction, by a slight push the device may be moved from place to place.

Having thus described my invention, I claim as new and desire to secure by Letters Patent—

The rigid rod D and the double socket E G, provided with two set-screws, F H, in combination with the carriage A B C D, substantially as herein shown and described.

PRESTON C. NASON.

Witnesses:
 WILL R. JONES,
 THOS. D. HUBBARD.